(12) United States Patent
Chambers et al.

(10) Patent No.: US 8,878,039 B2
(45) Date of Patent: Nov. 4, 2014

(54) DRUMSTICK HOLDER (75) Inventors: Richard Ian Chambers, Hertford (GB); Matthew Douglas Chambers, Ware (GB)

(73) Assignee: The Stageworks Gear Company Ltd., Hertfordshire (GB)

( * ) Notice: Subject to any disclaimer, the term of this patent is extended or adjusted under 35 U.S.C. 154(b) by 94 days.

(21) Appl. No.: 13/639,343

(22) PCT Filed: Apr. 5, 2011

(86) PCT No.: PCT/GB2011/000526
§ 371 (c)(1),
(2), (4) Date: Nov. 13, 2012

(87) PCT Pub. No.: WO2011/124881
PCT Pub. Date: Oct. 13, 2011

(65) Prior Publication Data
US 2013/0047820 A1 Feb. 28, 2013

(30) Foreign Application Priority Data

Apr. 8, 2010 (GB) .................................. 1005887.3

(51) Int. Cl.
*G10D 13/02* (2006.01)
*G10G 5/00* (2006.01)
*G10D 13/00* (2006.01)
*G01D 13/02* (2006.01)
*G10G 7/00* (2006.01)

(52) U.S. Cl.
CPC .............. *G10D 13/003* (2013.01); *G01D 13/02* (2013.01); *G10G 7/00* (2013.01); *G10D 13/026* (2013.01)
USPC .................................. 84/453; 84/327; 84/421

(58) Field of Classification Search
CPC ... G10D 13/003; G10D 13/02; G10D 13/026; G10G 7/00
USPC ............................................ 84/453, 421, 327
See application file for complete search history.

(56) References Cited

U.S. PATENT DOCUMENTS

| 923,610 A | 6/1909 | Wanamaker |
| D265,877 S * | 8/1982 | Hardy ............................ D8/376 |

(Continued)

FOREIGN PATENT DOCUMENTS

| DE | 296 12 315 | 9/1996 |
| DE | 20 2007 013121 | 5/2009 |
| GB | 2473898 A * | 3/2011 |

OTHER PUBLICATIONS

International Search Report Application No. PCT/GB2011/000526 dated Apr. 5, 2011, 6 pages.

*Primary Examiner* — David Warren
*Assistant Examiner* — Christina Russell
(74) *Attorney, Agent, or Firm* — Thomas|Horstemeyer, LLP (57) ABSTRACT

A drumstick holder, comprising: a member providing a surface; one or more retaining members (for example clips arranged to grip a drumstick) arranged to prevent or restrict free movement of a drumstick across the surface; a plurality of protrusions from the member; wherein the drumstick holder is adapted for fitting to a rim of a drum or further comprises means for fitting the member to a rim of a drum (for example a clamp); and when the drumstick holder is fitted to a drum rim, each respective protrusion engages a drum at a different respective position around a circumference of a drum rim. The surface may be substantially planar. The drum may be a bass drum.

20 Claims, 7 Drawing Sheets

(56) References Cited

U.S. PATENT DOCUMENTS

| | | | |
|---|---|---|---|
| 4,531,443 A * | 7/1985 | Gillis, Jr. | 84/329 |
| 4,671,158 A | 6/1987 | Saputo | |
| 4,939,972 A | 7/1990 | Falberg | |
| 5,117,724 A | 6/1992 | Gardner | |
| 5,199,621 A | 4/1993 | McLennan | |
| 5,272,952 A | 12/1993 | Hoshino | |
| 5,435,220 A | 7/1995 | Pultz | |
| 5,522,300 A * | 6/1996 | Cheatwood | 84/453 |
| 5,551,660 A * | 9/1996 | Leduchowski | 248/276.1 |
| 6,107,555 A * | 8/2000 | Hoshino | 84/421 |
| 6,150,595 A * | 11/2000 | Vaglica | 84/421 |
| 6,365,813 B1 * | 4/2002 | Gress | 84/422.4 |
| 7,164,074 B1 * | 1/2007 | Graham | 84/421 |
| 2007/0144331 A1 * | 6/2007 | Briggs et al. | 84/422.1 |
| 2014/0060285 A1 * | 3/2014 | Bradfield et al. | 84/411 R |
| 2014/0061413 A1 * | 3/2014 | Bradfield | 248/229.1 |

* cited by examiner

DRUMSTICK HOLDER

CROSS-REFERENCE TO RELATED APPLICATION

This application is the National Stage of International Application no. PCT/GB2011/000526, filed Apr. 5, 2011, and claims priority to GB Application No. 1005887.3, filed Apr. 8, 2010, the contents of which are incorporated by reference as if fully set forth herein.

FIELD OF THE INVENTION

The present invention relates to drumstick holders. In particular, the present invention relates to drumstick holders that may be secured to a drum.

BACKGROUND

Whilst drumming, a drummer may inadvertently drop a drumstick. Unless a replacement drumstick is quickly available, the drummer's performance may suffer.

Typically, drummers keep one or more spare drumsticks in a conventional drumstick holder attached to part of their drum-kit, resting on a portion of the drum-kit, or on the floor near to the drummer.

Conventional drumstick holders comprise a cup-like container into which drumsticks may be placed, and means for attaching the container to part of a drum-kit, for example a cymbal stand.

However, drumsticks retained in such a cup-like container are free to move around inside the container. Also, drumsticks resting on a portion of the drum-kit or the floor tend to be free to roll around to some extent. Thus, when a drummer reaches for a replacement drumstick, the drumstick may move (for example, as a result of vibrations resulting from playing of the drums, or the drummer inadvertently knocking the drumstick). This can make the retrieval of a drumstick awkward for a drummer, particularly mid-performance.

Moreover, the locations on a drum-kit that conventional drumstick holders may be placed, or that a spare drumstick may be rested, tend to be either inconvenient (meaning a drummer is required to stretch or reach for the drumstick) or such that the movements required to retrieve a drumstick are relatively complex or awkward (i.e. movements that are particularly different to those involved in drumming). These factors also can make the retrieval of a drumstick awkward for a drummer, particularly mid-performance, and noticeable by spectators.

SUMMARY OF THE INVENTION

In a first aspect, the present invention provides a drumstick holder, comprising a member providing a surface, one or more retaining members arranged to prevent or restrict free movement of a drumstick across the surface, a plurality of protrusions from the member, wherein the drumstick holder is adapted for fitting to a rim of a drum or further comprises means for fitting the member to a rim of a drum, and when the drumstick holder is fitted to a drum rim, each respective protrusion engages a drum at a different respective position around a circumference of a drum rim.

In a further aspect, the present invention provides a drumstick holder, comprising a member providing a surface, one or more retaining members arranged to prevent or restrict free movement of a drumstick across the surface, wherein the drumstick holder is adapted for fitting to a rim of a drum or further comprises means for fitting the member to a rim of a drum.

In a further aspect, the present invention provides a drumstick holder, comprising a member providing a surface, one or more retaining members arranged to prevent or restrict free movement of a drumstick across the surface, and a plurality of protrusions from the member, wherein when the drumstick holder is fitted to a drum rim, each respective protrusion engages a drum at a different respective position around a circumference of a drum rim.

In a further aspect, the present invention provides a drumstick holder, comprising a member providing a surface, and a plurality of protrusions from the member, wherein the drumstick holder is adapted for fitting to a rim of a drum or further comprises means for fitting the member to a rim of a drum, and when the drumstick holder is fitted to a drum rim, each respective protrusion engages a drum at a different respective position around a circumference of a drum rim.

In a further aspect, the present invention provides a drumstick holder, comprising one or more retaining members arranged to prevent or restrict free movement of a drumstick, and a plurality of protrusions, each protrusion being adapted to engage a drum at a different respective position around a circumference of a drum rim, wherein the drumstick holder is adapted for fitting to a rim of a drum or further comprises means for fitting the member to a rim of a drum, and when the drumstick holder is fitted to a drum rim, each respective protrusion engages a drum at a different respective position around a circumference of a drum rim.

In any of the above aspects, the one or more retaining members may be one or more clips arranged to grip a drumstick around a portion of the circumference of a shaft of the drumstick.

In any of the above aspects, the surface may be substantially planar.

In any of the above aspects, when the drumstick holder is fitted to a drum rim, the surface may be substantially parallel to a tangent to the circumference of the drum.

In any of the above aspects, when the drumstick holder is fitted to a drum rim, the surface may be substantially parallel to a surface that is tangential to the circumference of the drum.

In any of the above aspects, the drumstick holder may be adapted to retain a drumstick such that the drumstick is substantially parallel to the surface.

In any of the above aspects, when the drumstick holder is fitted to a drum rim, the drumstick holder may be adapted to retain a drumstick such that the drumstick is substantially parallel to a longitudinal axis of the drum rim.

In any of the above aspects, the one or more retaining members may be arranged to permit removal of a drumstick in a direction perpendicular to a surface that is tangential to the circumference of the drum rim.

In any of the above aspects, the one or more retaining members may be arranged to engage or hold a drumstick at two different positions along a shaft of the drumstick.

In any of the above aspects, when the drumstick holder is fitted to a drum rim, the one or more retaining members may be arranged to retain a drumstick such that a portion of a shaft of the drumstick protrudes over an end of the drum.

In any of the above aspects, the drumstick holder may be arranged to hold two or more drumsticks substantially parallel to each one another.

In any of the above aspects, the drumstick holder may further comprise a protective member for protecting the one or more retaining members from breakage, the protecting means comprising one or more walls substantially along one or more respective sides of the drum stick holder adapted to impede an object from impacting with the gripping means along the one or more respective sides.

In any of the above aspects, the drum that the drumstick holder is adapted for fitting to may be a bass drum.

In a further aspect, the present invention provides a clamp for clamping to a drum rim of a drum, the clamp comprising a first clamp jaw, and a second clamp jaw, wherein the first clamp jaw is configured to engage a free end of the drum rim, and the second clamp jaw is configured to engage a portion of the drum proximate to an end of the drum rim opposite the free end of the drum rim.

The first clamp jaw may have a first portion and a second portion oblique to the first portion such that the first clamp jaw is configured to hook over a free end of the drum rim.

The second clamp jaw may have a first portion and a second portion oblique to the first portion such that the second clamp jaw is configured to hook around a drum head ring.

An angle between the first portion of the first clamp jaw and the second portion of the first clamp jaw may be in the range 75 degrees to 110 degrees.

An angle between the first portion of the first clamp jaw and the second portion of the first clamp jaw may be in the range 90 degrees to 98 degrees.

An angle between the first portion of the first clamp jaw and the second portion of the first clamp jaw may be substantially 95 degrees.

An angle between the first portion of the second clamp jaw and the second portion of the second clamp jaw may be in the range 115 degrees to 175 degrees.

An angle between the first portion of the second clamp jaw and the second portion of the second clamp jaw may be in the range 130 degrees to 140 degrees.

An angle between the first portion of the second clamp jaw and the second portion of the second clamp jaw may be substantially 135 degrees.

The drum that the clamp is for clamping to may be a bass drum.

The clamp may further comprise means for tightening and/or loosening the clamp around the drum rim, wherein the means for tightening and/or loosening may be operated using a drum key.

The clamp may be coupled to a drumstick holder according to any of the above aspects.

In a further aspect, the present invention provides a drumstick holder according to any of the above aspects, wherein the means for fixing the member to a rim of a drum is a clamp according to any of the above aspects.

In a further aspect, the present invention provides a drum comprising a drumstick holder according to any of the above aspects.

In a further aspect, the present invention provides a drum rim comprising a drumstick holder according to any of the above aspects.

In a further aspect, the present invention provides a drum comprising a member providing a surface, and one or more retaining members arranged to prevent or restrict free movement of a drumstick across the surface.

The one or more retaining members may be one or more clips arranged to grip a drumstick around a portion of the circumference of a shaft of the drumstick.

The drum may be a bass drum.

In a further aspect, the present invention provides a drum rim comprising a member providing a surface, and one or more retaining members arranged to prevent or restrict free movement of a drumstick across the surface.

The one or more retaining members may be one or more clips arranged to grip a drumstick around a portion of the circumference of a shaft of the drumstick.

The drum rim may be a bass drum rim.

DETAILED DESCRIPTION

Figure 1:
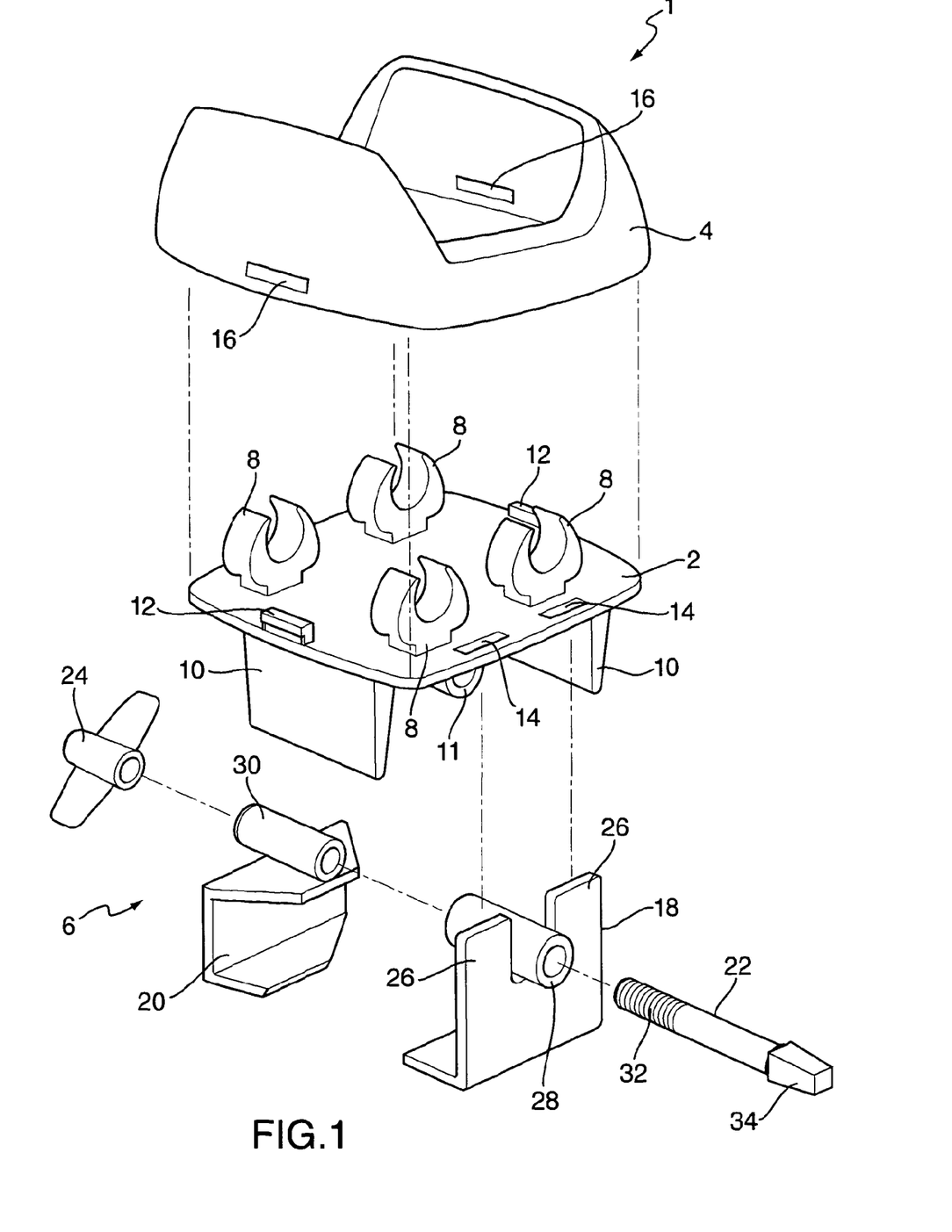
FIG. 1 is a schematic illustration (not to scale) of an exploded perspective view of a drumstick holder.

FIG. 1 is a schematic illustration (not to scale) of an exploded perspective view of a drumstick holder 1. The drumstick holder 1 comprises a clip plate 2, an outer casing 4, and a clamp 6.

In this embodiment, the clip plate 2 comprises a substantially square plate having four clips 8, two struts 10, a tubular portion (hereinafter referred to as the "plate tube 11"), two tabs (hereinafter referred to as "plate tabs 12"), and two slots (hereinafter referred to as "plate slots 14"). The clip plate 2 (including the clips 8, struts 10, and plate tabs 12) are made of plastic.

In this embodiment, each clip 8 extends from a top surface of the clip plate 2. Each of the clips 8 is adapted to grip a drumstick around part of the circumference of the shaft of the drumstick, as described in more detail with reference to FIG. 4.

The clips 8 are arranged in two rows of two clips. The two clips 8 in a first row of clips are positioned side-by-side proximate to a front edge of the top surface of the clip plate 2. The two clips 8 in a second row of clips are positioned side-by-side proximate to a rear edge of a top surface of the clip plate 2. The first and second rows of clips 8 are arranged such that a clip 8 in the first row of clips is aligned with a clip 8 in the second row of clips. The term "aligned" is used herein to mean that a single drumstick may be clipped into the two aligned clips such that drumstick is held by the respective clips around substantially its circumference at two respective points along its length. In this embodiment, the clips 8 are arranged such that two drumsticks may be held in a parallel configuration, as described in more detail later below with reference to FIG. 4.

The struts 10 extend from a bottom surface, opposite the top surface, of the clip plate 2. The struts 10 advantageously facilitate the mounting of the drumstick holder to a bass drum as described below with reference to FIGS. 3A and 3B. In this embodiment, the two respective struts 10 are positioned proximate to respective opposite "side" edges of the bottom surface of the clip plate 2. Also, each strut 10 is substantially equidistant from the front and rear edges of the clip plate 2. Furthermore, each strut 10 is substantially perpendicular to the front and rear edges of the bottom surface of the clip plate 2, i.e. the struts 10 are substantially parallel to each other.

The plate tube 11 is a substantially tubular portion coupled to the bottom surface of the clip plate 2. The plate tube 11 facilitates the attaching of the clip plate 2 to the clamp 6, as described in more detail later below in the description of the clamp 6 and in the description of FIG. 6. In this embodiment, the plate tube 11 is positioned such that it is substantially parallel to the struts 10 and it is substantially equidistant from each strut 10 (i.e. the plate tube 11 is positioned down the middle of the bottom surface of the clip plate 2). In this embodiment, the plate tube 11 is moulded as part of the clip plate 2. However, in other embodiments, the plate tube 11 may be, for example, a separate member (e.g. one made from a different material to the clip plate 2) bonded to the bottom surface of the clip plate in any appropriate way.

The plate tabs 12 facilitate the secure attachment of the clip plate 2 to the outer casing 4 as described in more detail later below. In this embodiment, the plate tabs 12 are positioned along opposite edges of the top surface of the clip plate 2 such that each plate tab 12 is substantially equidistant from the front and rear edges of the clip plate 2.

The plate slots 14 facilitate the secure attachment of the clip plate 2 to the clamp 6 as described in more detail later below. In this embodiment, the plate slots 14 are holes through the clip plate 2 from the bottom surface to the top surface. The plate slots 14 are positioned proximate to the front edge of the top surface of the clip plate 2.

In this embodiment, the clip plate 2 is made of plastic. Also, in this embodiment the clip plate has the following dimensions. A length of the clip plate 2, i.e. a distance from the front edge of the clip plate 2 to the back edge of the clip plate 2, is sixty millimeters (60 mm). A width of the clip plate 2, i.e. a distance from a side edge of the clip plate 2 to an opposite side edge of the clip plate 2, is fifty-six millimeters (56 mm). A height of the clip plate 2, i.e. a vertical distance from a free end of a strut 10 to a free end of a clip 8, is thirty-five millimeters (35 mm).

In this embodiment the outer casing 4 is a substantially square wall in the form of a loop that surrounds the clip plate 2 along each of the four edges of the square top and bottom surfaces of the clip plate 2. The outer casing 4 is made of plastic.

The sides of the outer casing 4 that surround the clip plate 2 along its front and rear edges have substantially equal heights. In this embodiment, the heights of these sides of the outer casing are such that the top of these sides are at substantially the same level as the bottom of the clips 8 (i.e. the portion of the clips 8 nearest to the clip plate 2). Thus, in use when a drumstick is gripped or retained by a pair of clips 8, the drumstick is able to extend beyond both the front and rear edges of the clip plate 2 without being blocked by, or contacting, the outer casing 4. The lengths of the inner sides of the sides of the outer casing 4 that surround the clip plate 2 along its front and rear edges are approximately fifty-six millimeters (56 mm).

The sides of the outer casing 4 that surround the clip plate 2 along the edges of the clip plate 2 that are not the front or rear edges, i.e. the side edges of the clip plate 2, have substantially equal heights. In this embodiment, the heights of these sides of the outer casing 4 are such that the top of these sides are at substantially the same level as the top most points of the clips 8 (i.e. the portions of the clips 8 furthest away from the clip plate 2). In other words, when the drumstick holder 1 is viewed from one of these sides (with an eye level at the level of the top surface of the clip plate 2) the clips 8 are substantially completely obscured by the outer casing 4. An advantage provided by this feature is that the risk of damaged to the clips 8 caused by objects impacting the clip 8 from the sides of the drumstick holder 1 tend to be reduced. This is because such impacts tend to be deflected by the outer casing 4. This advantageously tends to provided that a drummer is able to leave the drumstick holder 1 attached to a bass drum of a drum-kit (as described in more detail later below with reference to FIGS. 3A, 3B and 4) during assembly, disassembly, and/or transport of the drum-kit, with a reduced risk of damage to a drumstick retaining clip 8 of the drumstick holder 1. The lengths of the inner sides of the sides of the outer casing 4 that surround the clip plate 2 along its side edges are approximately sixty millimeters (60 mm).

The outer casing 4 comprises two slots, hereinafter referred to as "casing slots 16". The casing slots 16 are positioned on the outer casing 4 such that, when the outer casing 4 is positioned on and around to clip plate 2, the plate tabs 12 clip into the casing slots 16, thereby securely coupling the outer casing 4 to the clip plate 2.

In this embodiment, the clamp 6 comprises a first clamp jaw 18, a second clamp jaw 20, a rod 22 and a nut 24. The first clamp jaw 18, the second clamp jaw 20, the rod 22 and the nut 24 are each made of nickel plated rumbled bright mild steel. The clamp 6 is adapted to clamp onto a rim of a drum (also called a "drum hoop"), as described in more detail later below with reference to FIG. 6.

In this embodiment, the first clamp jaw 18 is a substantially L-shaped member. The upright portion of the L-shaped first clamp jaw 18 has at its free end two tabs, hereinafter referred to as "clamp tabs 26". The first clamp jaw further comprises a tube portion, hereinafter referred to as the "first tube 28". The first tube 28 is positioned between the two clamp tabs 26 and lies substantially perpendicular to the upright portion of the L-shaped first clamp jaw 18.

Figure 2:
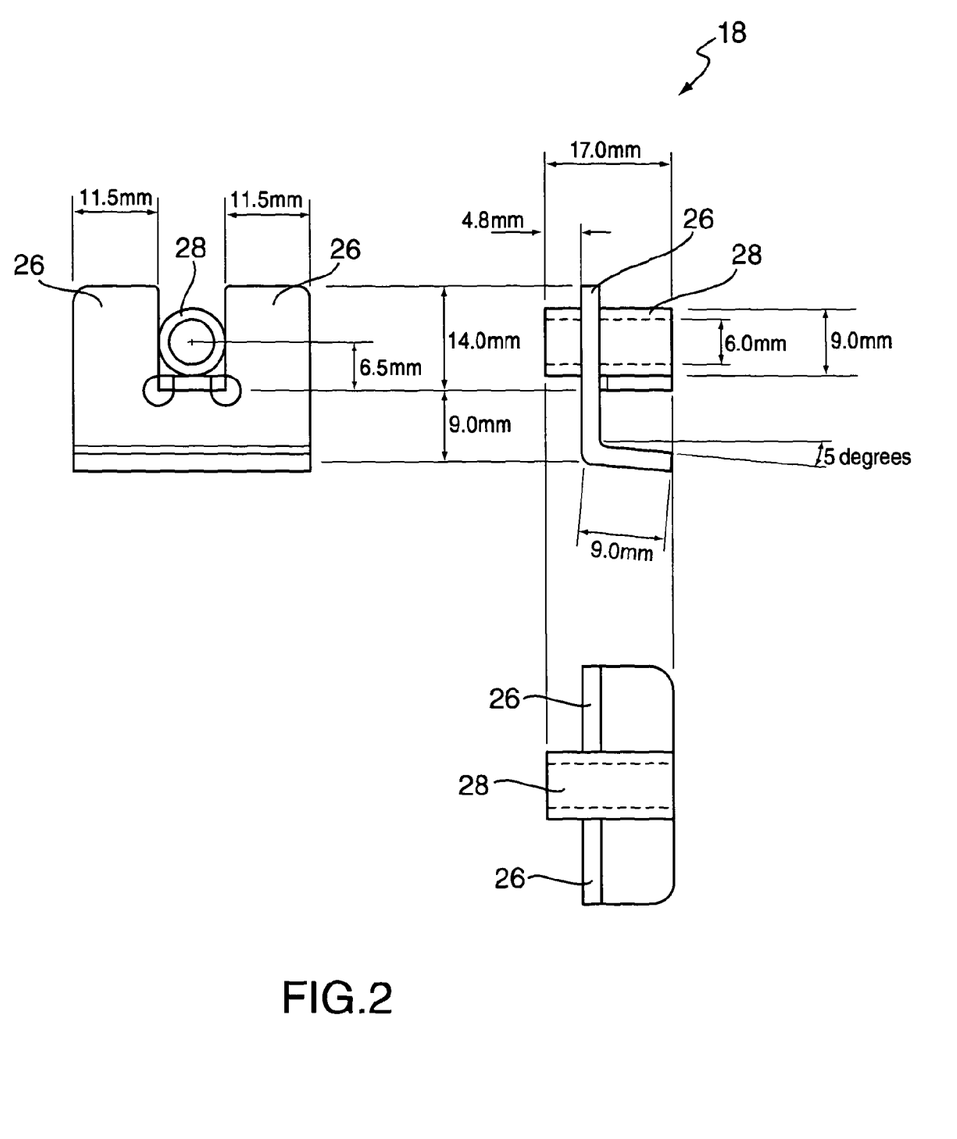
FIG. 2 is a schematic illustration (not to scale) of an orthographic projection of a first clamp jaw showing the dimensions of the first clamp jaw.

The dimensions of the first clamp jaw 18 are shown in FIG. 2, which is described later below.

In this embodiment, the clamp tabs 26 have a shape and relative position such that they may be inserted through the plate slots 14, thereby substantially securing the first clamp jaw 18 to the clip plate 2.

Figure 3:
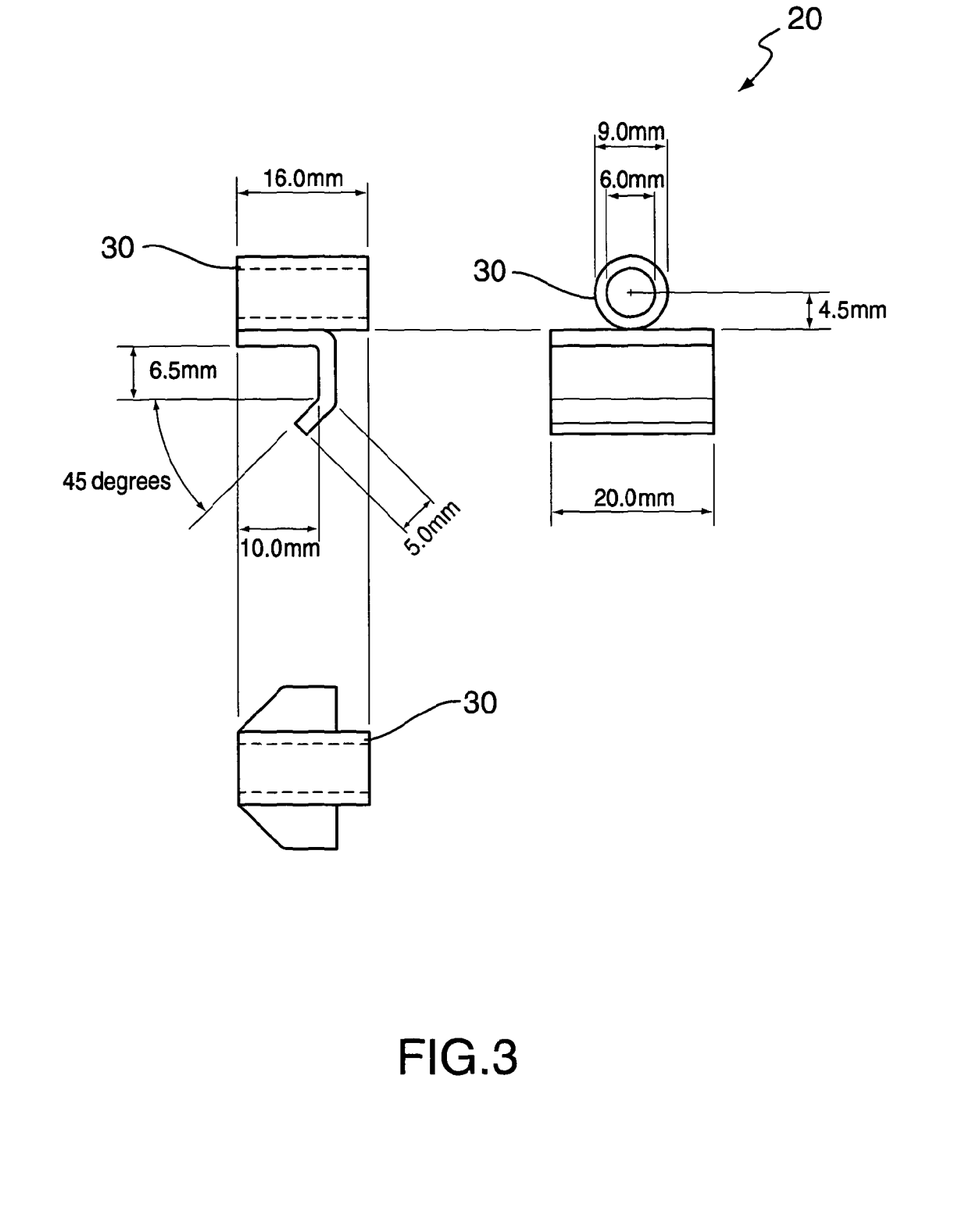
FIG. 3 is a schematic illustration (not to scale) of an orthographic projection of a second clamp jaw showing the dimensions of the second clamp jaw.

In this embodiment, the second clamp jaw 20 has a substantially upright portion, and a further portion that is oblique to the upright portion. In this embodiment, the angle between these two portions of the second clamp jaw 20 is 135 degrees (as shown in FIG. 3). The second clamp jaw 20 comprises a tube portion, hereinafter referred to as the "second tube 30", positioned on the uppermost portion of the second clamp jaw 20 such that it lies substantially perpendicular to the upright. The second tube 20 is substantially the same as the first tube 28.

The dimensions of the second clamp jaw 20 are shown in FIG. 3, which is described later below.

The rod 22 is adapted to be inserted through the first tube 28 of the first clamp jaw 18, the plate tube 11 of the clip plate 2, and the second tube 30 of the second clamp jaw 20, thereby coupling the clamp jaws 18, 20 together, and coupling the clip plate 2 to the clamp 6, as described in more detail later below with reference to FIG. 6. In other words, the clamp jaws 18, 20 are coupled together using the rod 22 and nut 24. Also, the first and second tubes 28, 30 are positioned either side of the plate tube 11 along the length of the rod 22. Thus, the clamp 6 may be coupled to the clip plate 2 using rod 22, by inserting the rod 22 through the first tube 28, through then plate tube 11, and then through the second tube 30. In this embodiment, the clamp tabs 26 are inserted into the plate slots 14 so that the first clamp jaw 18 remains substantially stationary relative to the clip plate 2.

A first end of the rod 22 comprises a thread such that, in effect, the first end of the rod 22 is a screw. This screw portion of the rod 22 is hereinafter referred to as the "screw end 32". At a second end of the rod 22, i.e. an end of the rod 22 opposite the first end (the screw end 32), is fixed a conventional drum nut 34. The drum nut 34 may be turned using a conventional drum key, thereby rotating the rod 22 about its axis.

In this embodiment, the length of the rod 22, i.e. the distance from the first end of the rod to the second end of the rod, is one hundred and six millimeters (106 mm). The threaded portion of the rod 22, i.e. the threaded portion at the screw end 32, is thirty-eight millimeters (38 mm). The length of the drum nut 34 is eleven millimeters (11 mm). Also, the length of a central portion of the rod 22, i.e. the portion of the rod between the threaded screw end 32 and the drum nut 34, is fifty-seven millimeters (57 mm).

In this embodiment, the diameter of the rod 22 is six millimeters (6 mm). Moreover, in this embodiment the diameters of the tubular portions (i.e. the first tube 28, the second tube, and the plate tube 11) are each such that the rod 22 may pass through these tube portions. In this embodiment, the diameter of the hollow portions of these tube portions is six millimeters (6 mm), thereby allowing the rod 22 to pass through the tubes whilst retain a relatively snug fit against the tube portions 11, 28, 30. In other embodiments, the tube portions 11, 28, 30 may have a different diameter, at least as large as the diameter of the rod 22. The nut 24 is adapted to screw onto the screw end 32 of the rod 22. This operation may be used to secure the clamp 6 about an object, for example a drum rim, as described below with reference to FIG. 6. In this embodiment, the nut 24 is a conventional wing nut.

FIG. 2 is a schematic illustration (not to scale) of an orthographic projection of the first clamp jaw 18 showing the dimensions of the first clamp jaw 18 in this embodiment.

FIG. 3 is a schematic illustration (not to scale) of an orthographic projection of the second clamp jaw 20 showing the dimensions of the second clamp jaw 20 in this embodiment.

Figure 4:
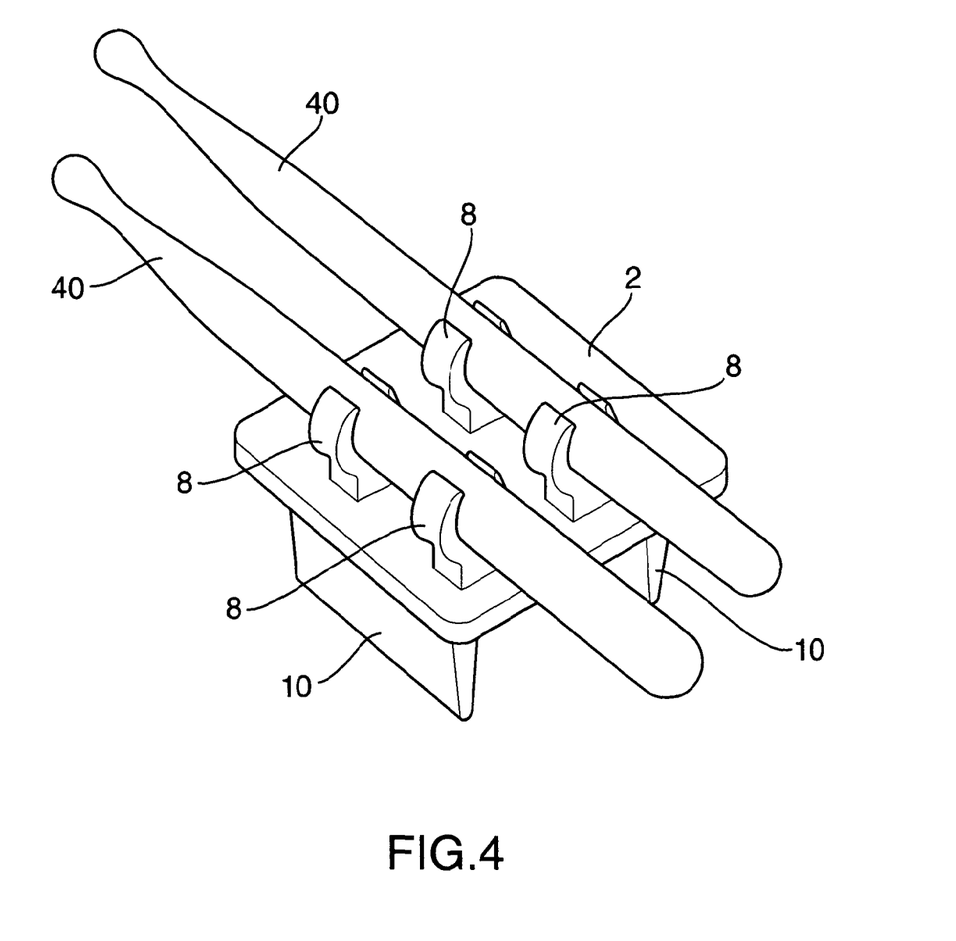
FIG. 4 is a schematic illustration (not to scale) of a perspective view of a clip plate retaining two drumsticks.

FIG. 4 is a schematic illustration (not to scale) of a perspective view of the clip plate 2 retaining two drumsticks 40.

In this embodiment the drumsticks 40 are 5A size drumsticks.

In this embodiment a drumstick 40 is gripped, or retained, around part of the circumference of its shaft by two clips 8 at different points along the length of its shaft. In other words, the a drumstick 40 is gripped by a clip 8 in the first row of clips proximate to the front edge of the top surface of the clip plate 2 and a clip 8 in the second row of clips proximate to the rear edge of a top surface of the clip plate 2. Also, in this embodiment the width of the gap between arms of a clip through which a drumstick clipped into the clip (and removed from the clip) is narrower than the diameter of the shaft of the drumstick.

A drumstick 40 may be removed from the clip plate 2 by the application of a force to the drumstick 40 in an upwards direction, i.e. a direction substantially perpendicular to the top surface of the clip plate 2 and away from the clip plate 2. This may be achieved, for example by a drummer, by gripping the handle of a drumstick 40 and pulling the drumstick 40 upwards, out of the clips 8. This feature of the drumsticks 40 being removable in an upwards direction relative to the top surface of the clip plate 2, together with the feature of how the clip plate 2 is positioned onto a rim of a bass drum, or bass drum hoop. This is described in more detail below with reference to FIGS. 3A and 3B, and is particularly advantageous for reasons given below in the description of FIGS. 3A and 3B.

A further advantage provided by the clip plate 2 is that the drumsticks 40 are held in a substantially parallel configuration, i.e. the drumsticks 40 have substantially the same orientation and a similar position. This tends to provide that the locating and removal of a drumstick 40 by a drummer (e.g. whilst playing the drums) may be achieved more easily than is the case with conventional drumstick holders. This tends to minimise the risk of adversely affecting a drumming performance.

A further advantage provided by the clip plate 2 is that the drumsticks 40 are each held at two points along their lengths (by two clips 8). This tends to provide that a drumstick 40 is held more steadily than is the case with conventional drumstick holders, i.e. the drumstick 40 is less likely to move around in the holder.

A further advantage provided by the clip plate 2 is that each respective drumstick 40 may be held in the clip plate 2 such that the respective amounts, or lengths, of the drumstick handles extending over the front edge of the clip plate 2 are different. This feature of being able to securely position the drumsticks 40 such that they each extend over the front edge of the clip plate 2 by a different amount, together with the feature of how the clip plate 2 is positioned onto a rim of a bass drum (described in more detail below with reference to FIGS. 3A and 3B) is particularly advantageous for reasons given below in the description of FIGS. 3A and 3B.

Figure 5A:
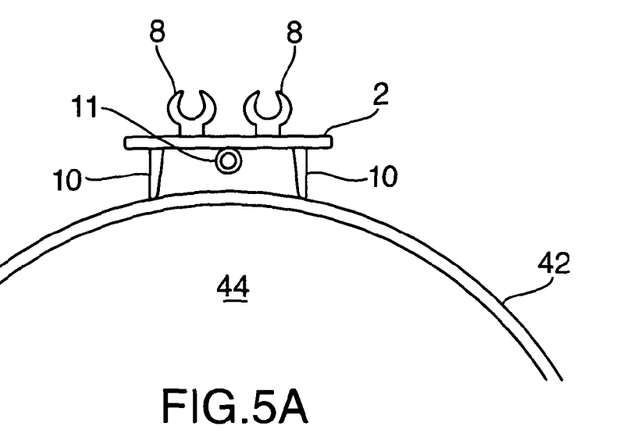
FIG. 5A is a schematic illustration (not to scale) of a front view of the clip plate on a bass drum rim (i.e. a bass drum hoop)

FIG. 5A is a schematic illustration (not to scale) of a front view of the clip plate 2 on a bass drum rim.

Figure 5B:
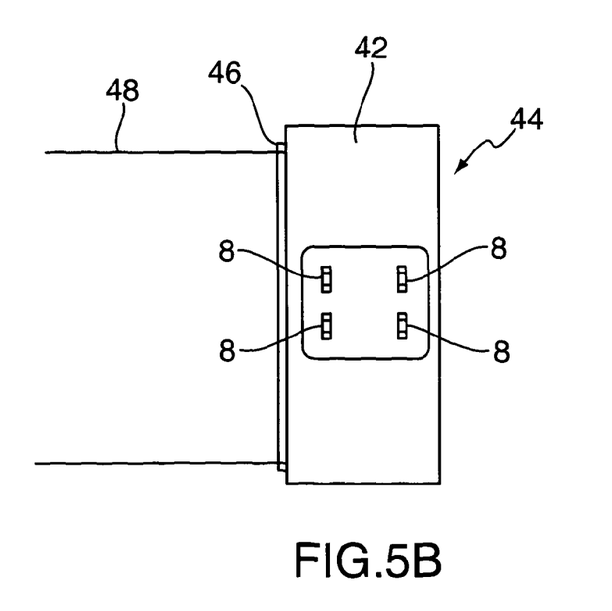
FIG. 5B is a schematic illustration (not to scale) of a top view of the clip plate on a bass drum rim.

FIG. 5B is a schematic illustration (not to scale) of a top view of the clip plate 2 on a bass drum rim.

In this embodiment, the bass drum is a conventional bass drum, or kick drum, comprising a cylindrical drum rim 42, a round drum head 44 which is surrounded by a drum head ring 46 and secured to a cylindrical drum body 48 by the drum rim 42. During use the bass drum is typically positioned in front of a seated drummer such that the drum head 44 is substantially vertical, i.e. such that the axis of the cylinder of the drum body 48 is substantially horizontal.

In this embodiment, during use the clip plate 2 is positioned onto the drum rim 42 such that the struts 10 are positioned at different points around the circumference of the drum rim 42 and such that the top surface of the clip plate 2 is substantially horizontal.

In this embodiment, the clip plate 2 of the drumstick holder 1 is secured to the drum rim 42 using the clamp 6 as described below with reference to FIG. 6. Also, during use the outer casing 4 (not shown in FIGS. 3A and 3B) is affixed to the clip plate 2 as described above with reference to FIG. 1.

In this embodiment, the drumsticks 40 are clipped into the clips 8 of the clip plate 2 such that the handle ends of the drumsticks 40 extend towards a drummer over the end of the drum rim 42 nearest the drummer.

An advantage provided by the positioning of the clip plate 2 on the drum rim 42 of the bass drum (as described above with reference to FIGS. 3A and 3B), and the feature of the drumsticks 40 being removable in an upwards direction relative to the top surface of the clip plate 2 (as described above with reference to FIG. 4) is that the retrieval of a drumstick 40 by a drummer using the drum, e.g. to replace a dropped stick mid-performance, tends to be a particularly intuitive operation. In particular, during use the drumstick holder 1 (attached to a drum rim 42 of the bass drum as described above) is positioned directly in front of the drummer, for example between the drummer's legs. This tends to provide that the drummer does not have to reach for a drumstick that is held in a more awkward position. Moreover, the upwards motion required to remove a drumstick 40 from the clip plate 2 of the drumstick holder 1 tends to be a very natural movement for a drummer (whose arms are typically moving in upwards and downwards directions when playing the drums) which can be performed without causing significant interruption to the drummer's performance or being particularly visible to an audience.

An advantage provided by the positioning of the clip plate 2 on the drum rim 42 (as described above with reference to FIGS. 3A and 3B), and the feature of being able to securely position the drumsticks 40 such that they each extend over the front edge of the clip plate 2 by a different amount (as described above with reference to FIG. 4) is that, during use, drumsticks 40 may be positioned such that they each extend over an edge of the bass drum nearest the drummer towards the drummer by a different amount. This tends to mean that one of the drumsticks 40, for example the drumstick extending furthest from the drum, is more accessible, i.e. easier or more convenient to retrieve, than the other. This tends to provide that, should a drumstick 40 be required, a drummer is more likely to retrieve the easiest to retrieve drumstick first without inadvertently removing both drumsticks 40 from the drumstick holder 1 at the same time. In other words, an advantage provided by the drumstick holder 1 is that a risk of a drummer removing more than the required number of drumsticks 40 at any point during a performance tends to be reduced. Also, if two different types of drumsticks are held in the drumstick holder, the facility to position the drumsticks with the drumstick holder 1 differently tends to facilitate the drummer recognising and retrieving the drumstick that is required.

An advantage provided by the struts 10 of the clip plate 2 is that the clip plate 2 tends to be relatively stable when mounted on the drum rim 42. In other words, the struts 10 tend to oppose movement of the clip plate 2 in directions around the circumference of the drum rim 42, and also tend to prevent or alleviate any 'rocking' motion of the clip plate 2 relative to the drum rim 42.

A further advantage provided by the struts 10 of the clip plate 2 is that the clip plate 2 may be securely positioned (as described in FIGS. 3A and 3B) on drum rims of different sizes.

Figure 6:
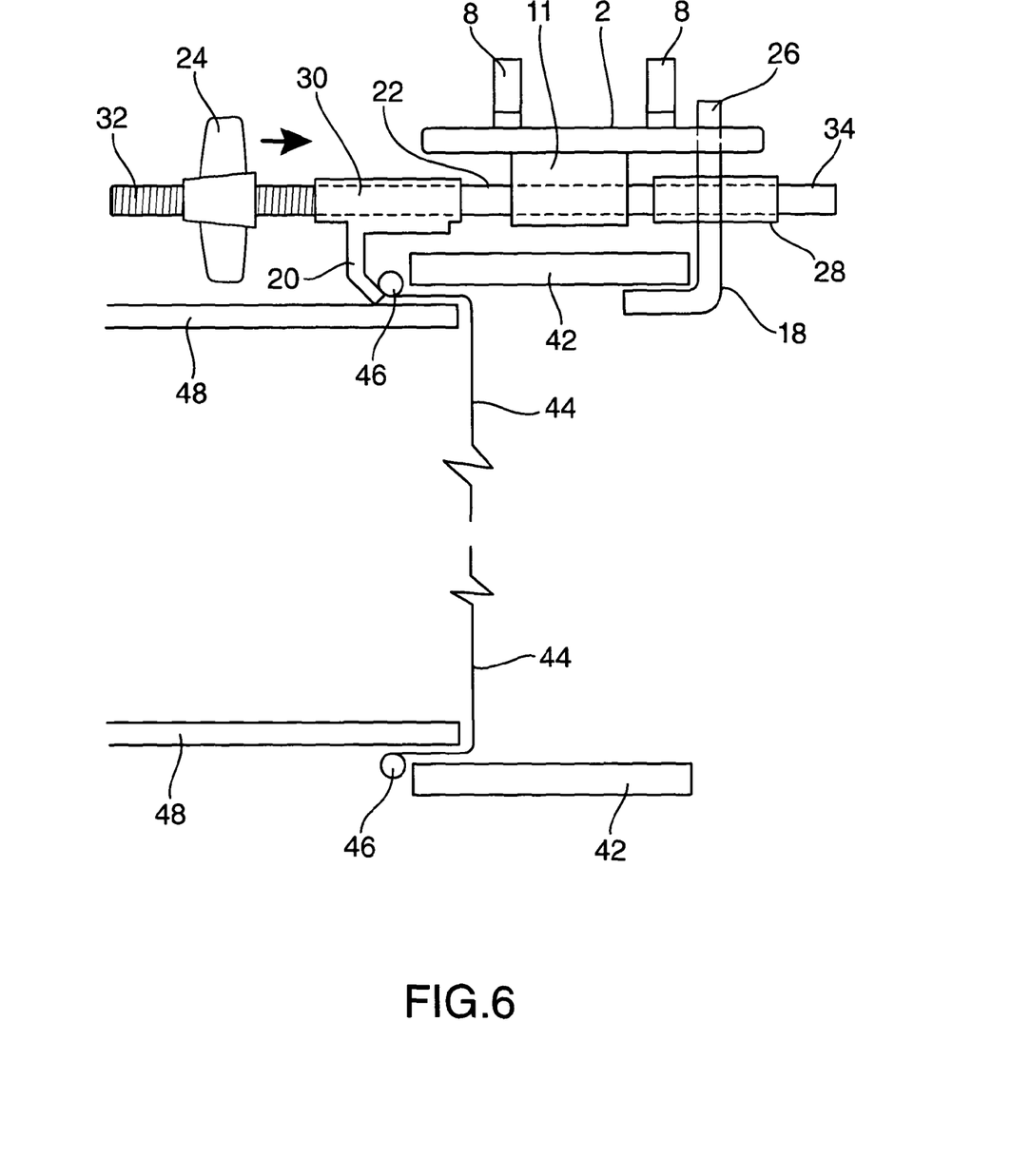
FIG. 6 is a schematic illustration (not to scale) of a cross section of a side view of the clamp secured to the drum rim.

FIG. 6 is a schematic illustration (not to scale) of a cross section of a side view of the clamp 6 secured to the drum.

FIG. 6 shows the (conventional) bass drum which comprises the circular drum head 44, around the edge of which is the drum head ring 46, placed over an end of the cylinder of the drum body 48. The drum head 44 is kept in place over the end of the drum body 48 by the drum rim 42 being forced around the outside of the drum body 48 at the end of the drum body cylinder bearing the drum head 44, thereby opposing movement the drum head ring 46 towards that end of the drum body 48. The drum head 44 may be tightened over the drum body by forcing the drum rim 42 further onto the drum body 48 thereby pushing the drum head ring 46 down the length of the drum body 48.

In this embodiment, the first clamp jaw 18 is positioned such that the substantially upright portion of the L-shaped first clamp jaw 18 abuts an edge of the drum rim 42 at the front of the drum, the bottom portion of the L-shaped first clamp jaw 18 is in contact with an inside surface of the drum rim 42, and the first tube 28 of the first clamp jaw 18 is positioned outside the drum rim 42 and substantially parallel to the axis of the cylinder of the drum rim 42.

In this embodiment, the second clamp jaw 20 is positioned such that it hooks around the drum head ring 46 to some extent, and such that the second tube 30 of the second clamp jaw 20 is positioned outside the drum rim 42 and drum body 48 and substantially parallel to the axis of the cylinder of the drum rim 42.

The first clamp jaw 18 and the second clamp jaw 20 are coupled via the rod 22 which is positioned such that it lies through the first tube 28 and the second tube 30. The clamp jaws 18, 20 are secured to the drum rim 42 by screwing the nut 24 onto the screw end 32 of the rod 22 in the direction indicated by an arrow in FIG. 6. Thus, the clamp 6 is adapted to clamp onto the drum rim 42. The clamp 6 may be removed from the drum rim 42 by screwing the nut 24 along the rod 22 in the opposite direction to that of the arrow in FIG. 6, thereby allowing the first and second clamp jaws 18, 20 to be moved apart. In this embodiment, the clamp may also be tightened and/or loosened by holding the nut 24 stationary and rotating the drum nut 34 (and therefore the rod 22), for example by using a conventional drum key.

The clamp 6 tends to be advantageously capable of being able to be clamped at any point around the drum rim 42. The first clamp member 18 is adapted to engage a free end of the drum rim 42 at any point around the circumference of the free end of the drum rim 42. Also, the second clamp member 20 is adapted to engage the drum head ring 46 at any point around the circumference of the non-free end of the drum rim 42. Thus, a user may position the clamp 6 so that the drumsticks 40 are in a position convenient for them.

A further advantage provided by the clamp 6 is that the clamp 6 (and therefore the drumstick holder 1) tends to be capable of being secured to and removed from a bass drum with relative ease, and with a reduced risk of damage to the drum.

During use, the clamp 6 is used as described above to secure the clip plate 2 in a position described above with reference to FIG. 4. The clip plate 2 and the clamp 6 are coupled together by positioning the rod 22 through the plate tube 11. In this embodiment, the rod 22 is positioned through the plate tube such that the first tube 28 and the second tube 30 are positioned either side of the plate tube, i.e. the rod 22 is positioned through the first tube 28, the plate tube 11, and the second tube 30 in that order. Also, the clip plate 2 is secured relative to the first clamp jaw 18 via the plate slots 14 and the clamp tabs 26 as described above with reference to FIG. 1. Also, in this embodiment the outer casing is attached to the clip plate 2 via the plate tabs 12 and the casing slots 16, as described above with reference to FIG. 1.

Thus, there is provided a drumstick holder 1 capable of securely holding two drumsticks 40 that is adapted to be securely mounted to the rim 42 of a bass drum.

In the above embodiments, the drumstick holder is clamped to the rim of a bass drum (i.e. the bass drum hoop). This means that drumsticks held by the drumstick holder may be positioned particularly conveniently for a drummer, i.e. directly in front of the drummer and between his legs. However, in other embodiments the drumstick holder may be clamped to the rim of any appropriate type of drum. This allows a drummer to customise the positions of the replacement drumsticks on their kit. Moreover, it allows a drummer to secure a number of spare drumsticks at different points on the drum-kit. The clamp used to secure the drumstick holder to a drum rim may be adapted to fit to a variety of different drum rims, for example by changing the shape of the clamp jaws.

In the above embodiments, the clip plate comprises a substantially square plate. The flat, or planar, surface of the square plate provides a surface onto which the clips are attached. Also, the planar surface provides that when the drumstick holder is attached to the top of the rim of the bass drum of a drum-kit, the clips may be positioned such that they are substantially the same height above the floor. Furthermore, the planar surface provides that the direction in which each drumstick is required to be lifted to remove it from the drumstick holder is the approximately same, i.e. in a direction substantially perpendicular to the planar surface. However, in other embodiments the clip plate may be any appropriate shape to support the clips and/or the struts. For example, in other embodiments the clip plate may be curved e.g. to substantially match the curvature of a specific drum rim to which the drumstick holder is to be attached. Moreover, in other embodiments the plate from which the clips and struts protrude is not a solid surface. For example, the clips may be connected by a series of crosspieces, or beams, i.e. the plate may comprise one or more voids whilst still providing the function of a supporting surface for the clips/struts.

In the above embodiments, the clip plate comprises four clips (arranged in two rows of two clips). The clips are arranged to hold two 5A size drumsticks in a parallel configuration. However, in other embodiments the drum stick holder comprises a different number of clips, arranged in any formation. For example, in other embodiments there may be a sufficient number of clips to hold more than two drumsticks, and/or there may be a sufficient number of clips to provide that one or more drumsticks are gripped by more than two clips. Also, in other embodiments, any of the clips may be a different size, for example, a clip plate may be configured to hold a range of differently sized drumstick.

By gripping a drumstick at two different points spaced along its shaft (using two clips), the drumstick tends to be held more steadily than is the case with conventional drumstick holders or only using one such clip to hold the drumstick. This advantage may alternatively be provided by using a single clip of greater length than those in the above embodiments to hold the drumstick, i.e. a clip of such length that a drumstick is gripped along a significant portion of its shaft to provide stability comparable with that provided by the use of two spaced clips. In these cases however, the drumstick tends to be less easy to remove from the drumstick holder because more of the shaft is held by a clip and so a greater force tends to be required to remove it.

In the above embodiments, the clips are adapted to grip a drumstick around the circumference of its shaft. This is achieved by the width of the drumstick holding portion of the clip being slightly smaller than the diameter of the drumstick shaft. The shape of a clip is deformed from an original shape when a drumstick is clipped in to, i.e. the arms of a clip member are moved apart by the insertion of a drumstick. The clip arms exert a retaining force on the drumstick as a result of the elastic properties of the clip material. Also, the width of the gap between the arms of a clip is narrower than the diameter of the shaft of the drumstick. Thus, in the above embodiments a clip opposes both longitudinal and lateral movement of a drumstick clipped in it. This resistance to movement may be increased by increasing the friction between a clip and a drumstick, for example by covering a portion of a clip that in use is in contact with a drumstick with a rubber-like material. This tends to provide that a drumstick is held more securely by the clip. Indeed, the drumstick holder advantageously tends to provide sufficient grip to enable a drumstick to be held in orientations other than substantially horizontal, for example vertical. However, it may be more difficult to remove the drumstick from the clip. In other embodiments the clips need not be adapted to grip the drumstick as such and act only to house or retain the drumsticks, i.e. no force resulting from the elastic properties of the clip material are exerted on the drumstick by the clip arms. In other words, the clips need not oppose longitudinal movement of a drumstick in a direction along the axis of the drumstick and the clip arms act merely as retaining walls to oppose the lateral movement of the drumstick, i.e. retaining walls that prevent a drumstick rolling off a drum. Also, in other embodiments the width of the gap between the arms of a clip need not be narrower than the diameter of the shaft of the drumstick. This advantageously provides that less force tends to be required to remove a drumstick from the drumstick holder. However, in such cases it tends to be easier for drumsticks to fall out of the drumstick holder as vibrations resulting from the drums being played may result in the longitudinal movement of a drumstick in the holder.

Figure 7:
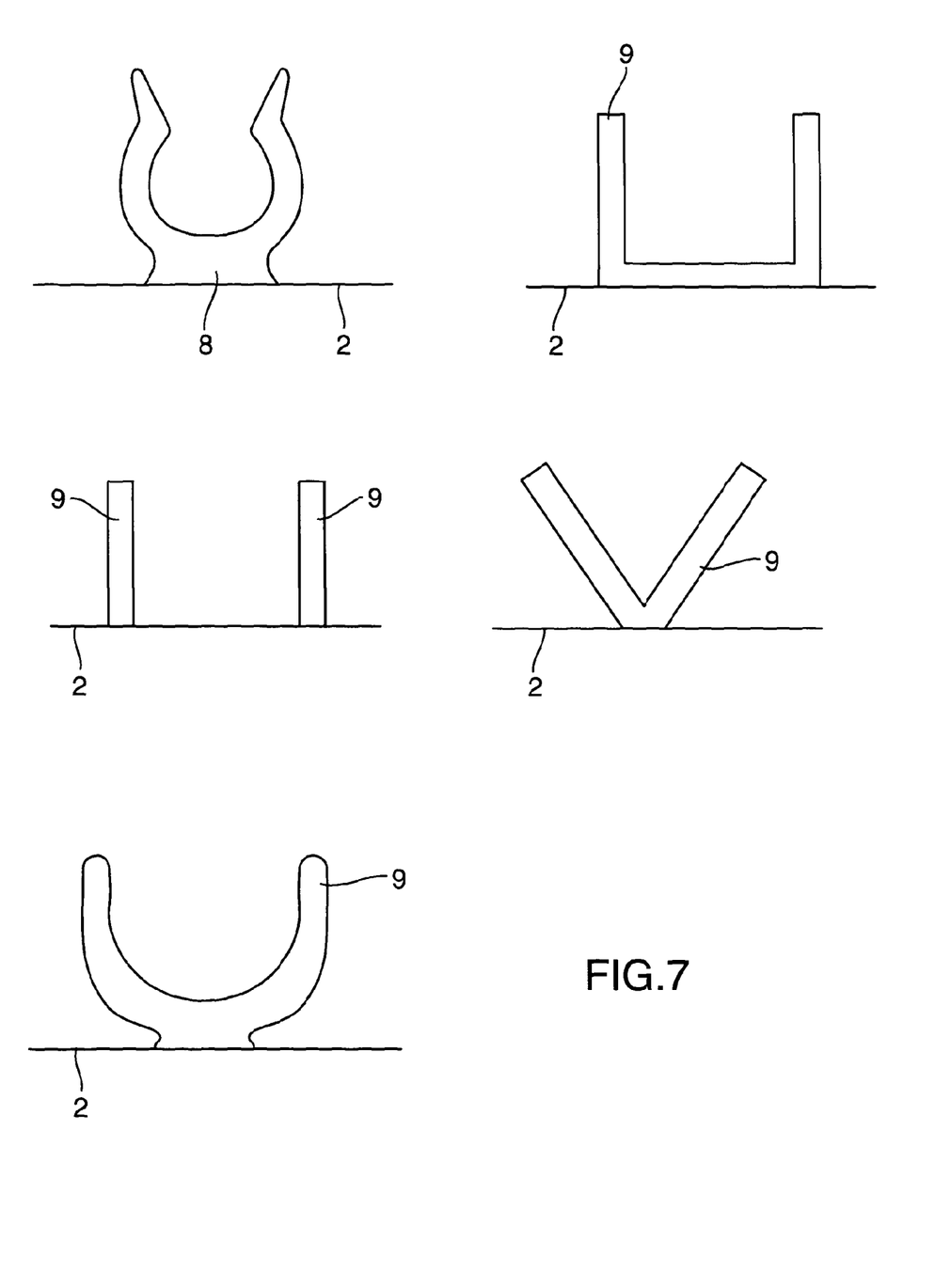
FIG. 7 is a schematic illustration (not to scale) of a cross section of the clips of the clip plate and cross sections of example alternative drumstick retaining members.

FIG. 7 is a schematic illustration (not to scale) of a cross section of the clips 8 and cross sections of example alternative drumstick retaining members 9 that may be used in other embodiments in place of one or more of the clips. The clips 8 and other drumstick retaining members 9 shown in FIG. 7 tend to prevent or restrict free movement of a drumstick retained by those members in directions in the plane of the clip plate 2, i.e. in directions in the plane of a surface provided by the clip plate 2 (e.g. the top surface). In other embodiments, drumstick retaining members other than those shown in FIG. 7 may be used, for example drumstick retaining members that grip a drumstick around its shaft, e.g. such that longitudinal movement of the drumstick is opposed. Also, in other embodiments any number of drumstick retaining members or clips may be used to retain any number of drumsticks. Also, in other embodiments a drumstick retaining member may be used to retain more than one drumstick.

In the above embodiments, the clip plate comprises two struts. A function of the struts is to facilitate the stable mounting of the clip plate to the round bass drum rim. A further function of the struts is to enable the clip plate to be mounted such that the flat plate may lie substantially horizontally. This advantageously tends to provide that the directions of the forces required to remove each of the drumsticks retained by the clip plate are substantially vertically upwards, i.e. a natural movement for a drummer when drumming. The aforementioned functions are achieved by placing one strut either side of the highest point on the bass drum such that the struts are substantially equidistant from the highest point. In this case, the respective opposing forces acting to move the clip plate in the respective two opposite direction about the drum rim are substantially equal, and the clip plate is relatively stable on the drum rim. In other words, the struts facilitate the substantially equal distribution of the drumstick holder's weight about the uppermost point of the drum rim. In other embodiments the clip plate comprises a different appropriate number of struts, or other protrusions from a surface of the clip plate, so as to provide the above described functions. Also, in other embodiments, the clip plate comprises no struts or protrusions, i.e. the above described functions of the struts and the corresponding advantages are not provided. In such cases, an advantage of the clip plate being relatively stable when mounted on the drum rim, i.e. tending to oppose movement of the clip plate in directions around the circumference of the drum rim, may be provided by different appropriate means. For example, the bottom surface of the clip plate may be covered with a non-slip material or adhesive.

In the above embodiments, the clip plate is coupled to the outer casing by the two plate tabs, and the two corresponding casing slots. However, in other embodiments, the clip plate is coupled to the outer casing by different appropriate means.

For example in other embodiments, the clip plate is coupled to the outer casing using a different number of plate tabs and corresponding casing slots. In other embodiment, the clip plate and outer casing may be bonded together, e.g. by using an adhesive, or be formed from a single piece of material.

In the above embodiments, the clip plate is made of plastic. This advantageously tends to be durable, lightweight, and flexible (thereby providing that the clips of the clip plate are capable of deforming). Moreover, the use of plastic for the clip plate tends to alleviate the risk of damage, such as scratches, to a drum rim, which tend to be harder/more rigid than plastic. However, in other embodiments, the clip plate is made of one or more different materials or a combination of plastic and a one or more different materials.

In the above embodiments, the outer casing is made of plastic. Also, in the above embodiments, the drumstick holder comprises the outer casing having the shape and dimensions described above with reference to FIG. 1. A function of the outer casing is to impede/deflecting blows, or impacts, from objects that may damage the clips whilst not being damaged itself. However, in other embodiments, the outer casing is made of one or more different materials or a combination of plastic and a one or more different materials. Also, in other embodiments the drumstick holder comprises an outer casing having a different appropriate shape or dimensions. In other embodiments the drumstick holder comprises no such outer casing. It is preferable for the outer casing to be of a material that is particularly suitable for providing the above described functionality.

In the above embodiments, the clip plate is coupled to the clamp by positioning the rod through the plate tube (the plate tube being aligned with first and second tubes and between the first and second tubes). However, in other embodiments, the clip plate is coupled to the clamp by different appropriate means. For example in other embodiments, the clip plate is coupled to the clamp only by inserting the clamp tabs into the corresponding plate slots. In this case the clamp tabs may advantageously be barbed to prevent or oppose removal of the clip plate from the clamp. The clip plate may be coupled to the clamp using a different number of clamp tabs and corresponding plate slots. In other embodiment, the clip plate and the clamp casing may be bonded together, e.g. by using an adhesive, or be formed from a single piece of material.

In the above embodiments, movement of the first clamp jaw relative to the clip plate is opposed by the two clamp tabs being inserted to some extent into the two corresponding plate slots. However, in other embodiments, movement of the first clamp jaw relative to the clip plate is not opposed. Also, in other embodiments movement of the second clamp jaw with respect to the clip plate may be opposed instead of or in addition to the movement of the first clamp jaw with respect to the clip plate.

In the above embodiments, all of the clamp tabs are part of the first clamp jaw. However, in other embodiments any number of the clamp tabs may be part of a different component of the clamp, for example the second clamp jaw.

In the above embodiments, the clamp comprises the first and the second clamp jaw, the rod, and the nut. These components may be employed as described above with reference to FIG. 6 to securely couple the clip plate to the bass drum rim. Each of the aforementioned components is made of metal. However, in other embodiments the clamp comprises different appropriate components that provide the above described functionality. Also, in other embodiments one or more of the components are made of one or more different appropriate materials, or metal and one or more different appropriate materials. For example, surfaces of one or more of the clamp jaws may be covered with a cushioning material, e.g. rubber, to further protect a drum rim from damage when the clamp is used.

In the above embodiments, the components of the clamp have the above recited dimensions. For example, the first clamp jaw has the dimensions shown in FIG. 2. Also, the second clamp jaw has the dimensions shown in FIG. 3. However, in other embodiments any of the components of the clamp may have different appropriate dimensions.

For example, in the above embodiments the first clamp jaw is a substantially L-shaped member having a first portion (the "upright" portion of the L-shape) and a second portion oblique to the first portion (the "bottom" portion of the L-shape). In the above embodiments, the angle between the first and second portion of the first clamp jaw is 95 degrees (i.e. 5 degrees from perpendicular), as shown in FIG. 2. In this way, the first clamp jaw is configured to engage a free end of the drum rim. In particular, in the above embodiments the first clamp jaw is configured to hook over a free end of the drum rim. In other embodiments, this configuration may be provided by a different angle between the first and second portion of the first clamp jaw. Preferably, this angle is between 75 degrees and 110 degrees. More preferably, this angle is between 85 and 100 degrees. More preferably, this angle is between 90 degrees and 98 degrees. More preferably, this angle is approximately 95 degrees.

Also, in the above embodiments the second clamp jaw comprises an "upright" first portion, and a second portion oblique to the first portion. In the above embodiments, the angle between the first and second portion of the second clamp jaw is 135 degrees (i.e. 45 degrees from perpendicular), as shown in FIG. 3. In this way, the second clamp jaw is configured to engage a portion of the drum proximate to an end of the drum rim opposite the free end of the drum rim. In particular, in the above embodiments the second clamp jaw is configured to hook around a drum head ring at the end of the drum rim opposite the free end of the drum rim. In other embodiments, this configuration may be provided by a different angle between the first and second portion of the second clamp jaw. Preferably, this angle is between 115 degrees and 175 degrees. More preferably, this angle is between 125 degrees and 145 degrees. More preferably, this angle is between 130 degrees and 140 degrees. More preferably, this angle is approximately 135 degrees.

In the above embodiment, the first and second jaws of the clamp are coupled together via the rod being inserted through the first tube of the first clamp jaw and the second tube of the second clamp jaw. The rod, in effect, provides a straight axis along which the clamp members may move apart and together. The range of the movement may be limited by the position of the nut along the rod. However, in other embodiments the clamp jaws may be coupled by different appropriate means whilst still providing the functionality of coupling the clamp jaws together and allowing for relative movement of the clamp jaws. For example the clamp jaws may be coupled by a spring. In such cases, the first and/or second tube portions of the clamp jaws may not be present. Such possibilities, e.g. a spring, do not necessarily require that a straight axis for the relative movement of the clamp jaws is provided. For example, the clamp members may pivot relative to each other about a point.

In the above embodiments, the first and second clamp jaws may be clamped onto and loosened from a drum rim by screwing the nut along the screw end of the rod. Also, the first and second clamp jaws may be clamped onto and loosened from a drum rim by keeping the nut substantially stationary and using a drum key to turn the drum nut (and thereby turn the rod relative to the nut). However, in other embodiments the clamps jaws may be tightened and/or loosen by a different appropriate means, for example a conventional ratchet arrangement.

In the above embodiment, the rod is partially threaded such that the nut may be screwed along the threaded portion of the rod, thereby allowing the tightening and loosening of the clamp around the drum rim. However, in other embodiments, the rod may be threaded to a different extent, for example the rod may be completely threaded. Also in other embodiments, an internal surface (i.e. an inside of a tube) of one or more of the following components may be threaded: the first tube of the first clamp jaw, the second tube of the second clamp jaw, and the plate tube. In such embodiments, the threaded portion of the rod may be screwed through the threaded first tube, second tube, and/or plate tube (e.g. by using a drum key to rotate the drum nut of the rod), thereby coupling together the clamp jaws and allowing the tightening and loosening of the clamp around the drum rim. Moreover, in such embodiments, the nut may be omitted.

In the above embodiments, the clip plate is secured to the drum rim using the clamp. Here, the clamp provides a function of securely coupling the clip plate to the drum rim. However, in other embodiments the clip plate may secured to the drum rim using different means. For example in other embodiments the clip plate may be bonded to the drum rim using adhesive, or the clip plate may be integrated in to the drum rim. Also, in other embodiments, the clip plate may be secured to other appropriate parts of the drum sufficiently to proximate the drum head to provide at least some of the above described advantages.

In the above embodiments, the clamp is used to secure the clip plate of the drumstick holder to the drum rim. However, in other embodiments the clamp may be used to secure any appropriate device to a drum rim. For example, the clamp may be used to secure different drumstick holders, additional drums or percussive instruments, concert lighting, microphones etc. to a drum rim.

In the above embodiments, the clips (or other drumstick retaining means) are secured to the drum rim (drum hoop) of a drum using the clamp. However, in other embodiments, clips and/or other drumstick retaining means may be integral to the drum or drum rim/hoop, for example by moulding clips and/or other drumstick retaining members as part of a drum or drum rim/hoop.

The invention claimed is:

1. A drumstick holder, comprising:
   a member providing a surface;
   one or more clips configured to prevent or restrict free movement of a drumstick across the surface; and
   a clamp for clamping the member to a drum rim of a drum; wherein
   when the drumstick holder is fitted to a drum rim, the drumstick holder is configured to retain a drumstick such that the drumstick is substantially parallel to a longitudinal axis of the drum rim;
   the clamp comprises a first clamp jaw and a second clamp jaw;
   the first clamp jaw is configured to engage a free end of the drum rim; and
   the second clamp jaw is configured to engage a portion of the drum proximate to an end of the drum rim opposite the free end of the drum rim.

2. A drumstick holder according to claim 1, wherein the one or more clips are configured to grip a drumstick around the circumference of a shaft of the drumstick.

3. A drumstick holder according to claim 1, wherein the surface is substantially planar.

4. A drumstick holder according to claim 1, wherein when the drumstick holder is fitted to a drum rim, the surface is substantially parallel to a tangent to the circumference of the drum.

5. A drumstick holder according to claim 1, wherein the drumstick holder is configured to retain a drumstick such that the drumstick is substantially parallel to the surface.

6. A drumstick holder according to claim 1, wherein the one or more clips are configured to permit removal of a drumstick in a direction perpendicular to the longitudinal axis of the drum rim.

7. A drumstick holder according to claim 1, wherein the one or more clips are configured to engage or hold a drumstick at two different positions along a shaft of the drumstick.

8. A drumstick holder according to claim 1, wherein, when the drumstick holder is fitted to a drum rim, the one or more clips are configured to retain a drumstick such that a portion of a shaft of the drumstick protrudes over an end of the drum.

9. A drumstick holder according to claim 1, wherein the drumstick holder is configured to hold two or more drumsticks substantially parallel to each one another.

10. A drumstick holder according to claim 1, further comprising a protective member for protecting the one or more clips from breakage, the protective member comprising one or more walls substantially along one or more respective sides of the drum stick holder configured to impede an object from impacting with the one or more clips along the one or more respective sides.

11. A drumstick holder according to claim 1, wherein the drum that the drumstick holder is configured to fit to is a bass drum.

12. A drumstick holder according to claim 1, wherein the first clamp jaw has a first portion and a second portion oblique to the first portion such that the first clamp jaw is configured to hook over a free end of the drum rim.

13. A drumstick holder according to claim 12, wherein an angle between the first portion of the first clamp jaw and the second portion of the first clamp jaw is in the range 75 degrees to 110 degrees.

14. A drumstick holder according to claim 1, wherein the second clamp jaw has a first portion and a second portion oblique to the first portion such that the second clamp jaw is configured to hook around a drum head ring.

15. A drumstick holder according to claim 14, wherein an angle between the first portion of the second clamp jaw and the second portion of the second clamp jaw is in the range 115 degrees to 175 degrees.

16. A drumstick holder according to claim 1, wherein the clamp further comprises means for tightening and/or loosening the clamp around the drum rim, wherein the means for tightening and/or loosening is operated using a drum key.

17. A drum comprising a drumstick holder according to claim 1.

18. A drum rim comprising a drumstick holder according to claim 1.

19. A drumstick holder, comprising:
   a member providing a surface;
   one or more clips configured to prevent or restrict free movement of a drumstick across the surface;
   means for fitting the member to a rim of a drum; and
   a protective member for protecting the one or more clips from breakage, the protective member comprising one or more walls substantially along one or more respective sides of the drum stick holder and configured to impede an object from impacting with the one or more clips.

20. A drumstick holder according to claim 19, wherein a distance that the walls extend from the member is greater than or equal to a distance that the one or more clips extend from the member.

* * * * *